(12) United States Patent
DeYoung

(10) Patent No.: US 7,029,261 B2
(45) Date of Patent: Apr. 18, 2006

(54) AUTOMATIC COVER LATCH AND PRESSURE RELIEF SYSTEM FOR A DOUGH DIVIDER

(75) Inventor: Perry R. DeYoung, Ada, MI (US)

(73) Assignee: Oliver Products Company, Grand Rapids, MI (US)

( * ) Notice: Subject to any disclaimer, the term of this patent is extended or adjusted under 35 U.S.C. 154(b) by 815 days.

(21) Appl. No.: 09/586,943

(22) Filed: Jun. 2, 2000

(65) Prior Publication Data

US 2002/0112585 A1 Aug. 22, 2002

(51) Int. Cl.
- A21C 3/10 (2006.01)
- A21C 5/08 (2006.01)
- B26D 1/04 (2006.01)

(52) U.S. Cl. .................. 425/153; 425/151; 425/298; 425/300; 83/176; 83/620; 83/DIG. 1; 100/226; 100/300; 426/503

(58) Field of Classification Search .............. 100/56, 100/250, 341, 345, 98 R, 226, 245, 255, 100/256, 266, 269.01, 269.06, 347; 83/DIG. 1, 83/19, 176, 399, 400, 620; 425/151, 153, 425/215, 298, 300, 416, 419, 420; 426/503; 452/42, 43
See application file for complete search history.

(56) References Cited

U.S. PATENT DOCUMENTS

| | | | | |
|---|---|---|---|---|
| 244,448 A | * | 7/1881 | Grant | 100/250 |
| 701,882 A | * | 6/1902 | Holden | 100/250 X |
| 889,122 A | * | 5/1908 | Hallahan | 100/250 X |
| 894,039 A | * | 7/1908 | Napier | 452/43 |
| 1,125,386 A | | 1/1915 | Oskamp | 425/215 |
| 1,295,809 A | * | 2/1919 | Stallman | 452/43 |
| 1,465,655 A | * | 8/1923 | Schmidt | 452/43 |
| 1,579,480 A | * | 4/1926 | Hoover | 100/229 R |
| 1,746,979 A | | 2/1930 | Woolley | 83/444 |
| 1,771,267 A | | 7/1930 | Miller | 425/98 |
| 1,805,705 A | | 5/1931 | Rausch | 426/503 |
| 1,816,753 A | | 7/1931 | Van Houten | 426/503 |
| 1,896,563 A | * | 2/1933 | Simon | 100/250 X |
| 1,896,564 A | * | 2/1933 | Simon | 100/250 |
| 2,319,145 A | * | 5/1943 | Loomis | 100/250 X |
| 2,513,341 A | | 7/1950 | Marasco | 83/679 |
| 2,533,282 A | * | 12/1950 | Osman | 100/250 X |

(Continued)

OTHER PUBLICATIONS

Oliver Products Company, Users Operating and Instruction Manual, Aug. 26, 1999.

Primary Examiner—Clark F. Dexter
(74) Attorney, Agent, or Firm—Price, Heneveld, Cooper, DeWitt & Litton, LLP

(57) ABSTRACT

A dough divider including a hopper with a lid, latch assembly and press plate. The lid has an open and closed position. The latch assembly is adapted to maintain the lid in the closed position when activated and to discontinue maintaining the lid in the closed position when deactivated. The press plate is vertically slidable within the hopper, with the hopper being adapted to accept dough between the lid and the press plate. The press plate is adapted to be driven towards the lid in order to compress the dough between the press plate and the lid within the hopper. The latch assembly is automatically activated to maintain the lid in the closed position while the press plate is being driven towards the lid. The latch assembly is automatically deactivated to discontinue maintaining the lid in the closed position after the dough has been compressed and divided within the hopper.

66 Claims, 4 Drawing Sheets

U.S. PATENT DOCUMENTS

| | | |
|---|---|---|
| 2,695,570 A | 11/1954 | Helland .................. 425/216 |
| 3,452,687 A | 7/1969 | Kaneko et al. ............ 425/116 |
| 4,018,148 A * | 4/1977 | Wolbrink ................ 100/345 |
| 4,072,075 A | 2/1978 | Ezaki ..................... 83/153 |
| 4,424,740 A * | 1/1984 | Gwathney et al. .......... 100/52 |
| 4,552,061 A * | 11/1985 | Brutsman ................ 100/343 |
| 4,896,593 A * | 1/1990 | Slusser .................. 100/345 |
| 4,898,528 A | 2/1990 | Willard et al. ............ 425/185 |
| 4,950,147 A | 8/1990 | Willard et al. ............ 425/185 |
| 5,337,480 A | 8/1994 | Codikow ................. 30/114 |
| 5,340,298 A | 8/1994 | Beatty et al. ............. 425/183 |
| 5,435,714 A | 7/1995 | Van Lengerich et al. ... 425/313 |
| 5,832,804 A | 11/1998 | Dudley et al. ............ 83/870 |
| 6,431,848 B1 * | 8/2002 | Petersen ................. 425/153 |

\* cited by examiner

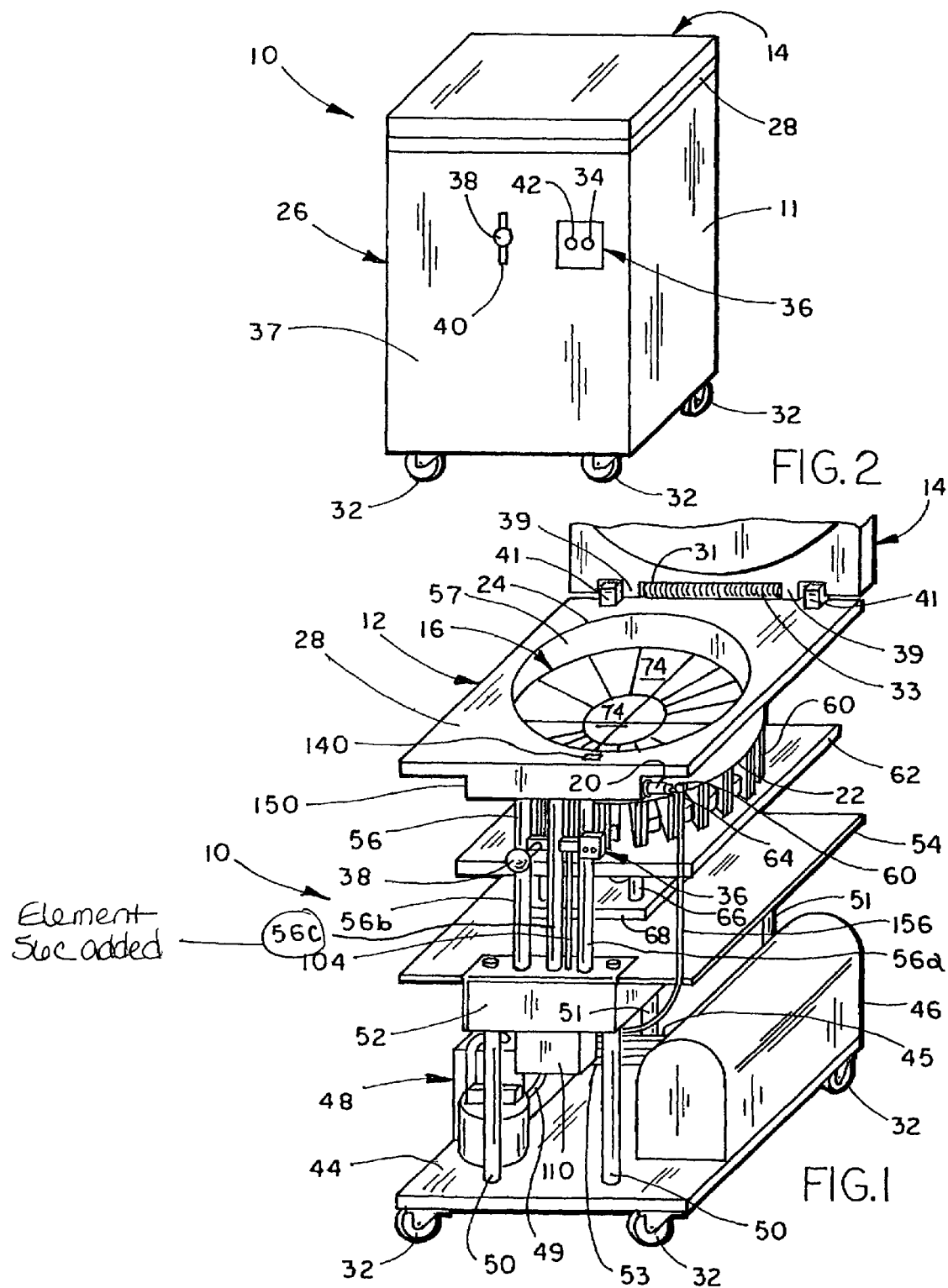

US 7,029,261 B2

AUTOMATIC COVER LATCH AND PRESSURE RELIEF SYSTEM FOR A DOUGH DIVIDER

BACKGROUND OF THE INVENTION

This invention relates to dough dividers, and in particular to dough dividers with a sealed chamber in which the dough is positioned.

Dough dividers are used extensively for dividing large masses of dough into small, ready to use pieces of dough. Dough dividers are used in the pizza and bakery businesses for evenly dividing the large mass of dough into, for example, an equal number of pizza crusts or loaves of bread.

Heretofore, dough dividers have included machines having sealable chambers, wherein the dough is placed within the chamber and compressed in order to have the dough completely and uniformly fill the chamber and evenly divide the dough. The dough dividers have a lid that closes the top of the chamber and a bottom floor that can rise towards the lid in order to compress the dough between the lid and the floor. After the dough has been compressed, knives are inserted through the floor of the dough divider in order to evenly divide the dough.

A problem with such dough dividers arises if the dough is left in the chamber for an extended period of time. As the dough remains in the chamber, yeast in the dough causes the dough to rise and thereby exerts pressure against the lid of the chamber. Therefore, the chamber will have a large amount of pressure acting against the bottom of the lid. This large amount of pressure acting against the bottom of the lid can wedge the locking mechanism of the lid, thereby making the lid very hard to open. Furthermore, when the lid is finally opened, the lid will be forced rapidly and dangerously upward because of the pressure applied to the bottom of the lid.

Accordingly, an apparatus solving the aforementioned disadvantages and having the aforementioned advantages is desired.

SUMMARY OF THE INVENTION

One aspect of the present invention is to provide a dough divider that includes a hopper with a lid, a latch assembly and a press plate. The lid has an open position and a closed position. The latch assembly is adapted to maintain the lid in the closed position when activated and to discontinue maintaining the lid in the closed position when deactivated. The press plate is vertically slidable within the hopper, with the hopper being adapted to accept dough between the lid and the press plate. The press plate is adapted to be driven towards the lid in order to compress the dough between the press plate and the lid within the hopper. The latch assembly is automatically activated to maintain the lid in the closed position while the press plate is being driven towards the lid.

Another aspect of the present invention is to provide a dough divider that includes a hopper with a lid, a latch assembly and a press plate. The lid has an open position and a closed position. The latch assembly is adapted to maintain the lid in the closed position when activated and to discontinue maintaining the lid in the closed position when deactivated. The press plate is vertically slidable within the hopper, with the hopper being adapted to accept dough between the lid and the press plate. The press plate is adapted to be driven towards the lid in order to compress the dough between the press plate and the lid within the hopper. The latch assembly is automatically deactivated to discontinue maintaining the lid in the closed position after the dough has been compressed and divided within the hopper.

The dough divider of the present invention is safe and easy to use. The dough divider with pressure relief allows a person to easily divide large masses of dough and remove the dough from the dough divider easily and without injury. The dough divider with pressure relief is efficient in use, economical to manufacture, capable of a long operable life, and particularly adapted for the proposed use.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a perspective view of the dough divider of the present invention with a shell removed from a main body;

FIG. 2 is perspective view of the dough divider of the present invention;

DETAILED DESCRIPTION OF THE PREFERRED EMBODIMENT

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 8:
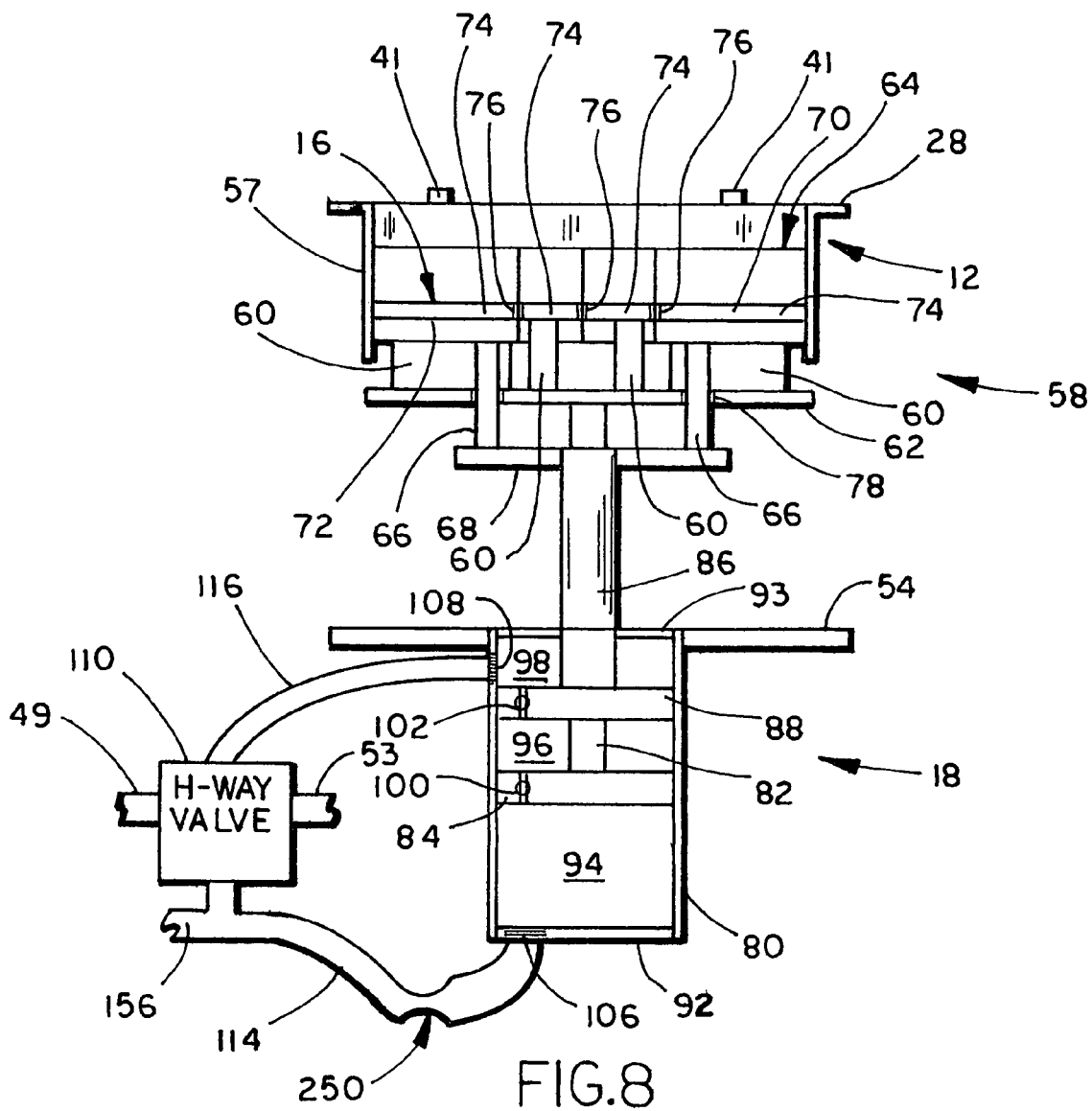
FIG. 8 is cross-sectional view of a reversible cylinder, the press plate, a knife assembly and the hopper of the present invention.

The reference number 10 (FIG. 1) generally designates a dough divider with pressure relief embodying the present invention. The illustrated dough divider 10 is shown in FIG. 1 with a shell 11 (see FIG. 2) removed. The dough divider 10 includes a hopper 12 with a lid 14, a latch assembly 20 and a press plate 16. The lid 14 has an open position (see FIG. 1) and a closed position (see FIG. 2). The latch assembly 20 is adapted to maintain the lid 14 in the closed position when activated and to discontinue maintaining the lid 14 in the closed position when deactivated. The press plate 16 is vertically slidable within the hopper 12, with the hopper 12 being adapted to accept dough (not shown) between the lid 14 and the press plate 16. The press plate 16 is adapted to be driven towards the lid 14 in order to compress the dough between the press plate 16 and the lid 14 within the hopper 12. The latch assembly 20 is automatically activated to maintain the lid 14 in the closed position while the press plate 16 is being driven towards the lid 14. The latch assembly 20 also is automatically deactivated to discontinue maintaining the lid 14 in the closed position after the dough has been compressed and divided within the hopper 12. The illustrated dough divider 10 also includes a knife assembly 64 adapted to move towards the lid 14 in order to divide the dough. The illustrated dough divider 10 further includes a pressure relief system including a reversible cylinder assembly 18 (FIG. 8). The reversible cylinder assembly 18 is connected to the press plate 16 and adapted to move downward in order to allow the press plate 16 to move from a top 24 of the hopper 12 towards a bottom 22 of the hopper 12, when pressure applied to a top of the press plate 16 from the dough reaches a predetermined level.

The illustrated dough divider 10 (FIG. 2) has a main housing body 26 having a rectangular cross-section and rectangular faces, with the lid 14 pivotally attached to the top of the main housing body 26. The lid 14 is preferably rectangular with the same length and width dimensions as the main housing body 26. A rectangular flange 28 at the top of the hopper 12 (see FIG. 1) is located at the top of the body 26. As described in more detail below, the automatic latch assembly 20 is configured to maintain the lid 14 in the closed position. As shown in FIG. 1, a pin 31 is inserted through struts 39 on the lid 14 and associated struts 41 on the top of the hopper 12, thereby pivotally attaching the lid 14 to the rear of the hopper 12. A torsional spring 33 surrounding the pin 31 biases the lid 14 to an open position, thereby allowing access to the hopper 12. The main housing body 26 also has casters 32 at a bottom end, thereby allowing the dough divider 10 to be easily moved. The shell 11 is located between the rectangular flange 28 of the hopper 12 and the bottom end of the main housing body 26. Preferably, the lid 14 and the hopper 12 are made of heavy cast aluminum. A front face 37 of the shell 11 has a switch housing 36 extending from the front face 37 and an actuating mechanism 38 that protrudes through a vertical slot 40 in the front face 37 of the shell 11. In the illustrated example, the actuating mechanism 38 is a control valve handle. The dough divider 10 is powered by pressing an on-button 34 located within a switch housing 36 and turned off by pressing an off-button 42 located within the switch housing 36. As described in more detail below, the reversible cylinder assembly 18 is operated by raising or lowering the control valve handle 38. Although the actuating mechanism 38 is disclosed as being a handle, the actuating mechanism 38 could include a push button or any other device or assembly for actuating the reversible cylinder assembly 18.

Figure 3:
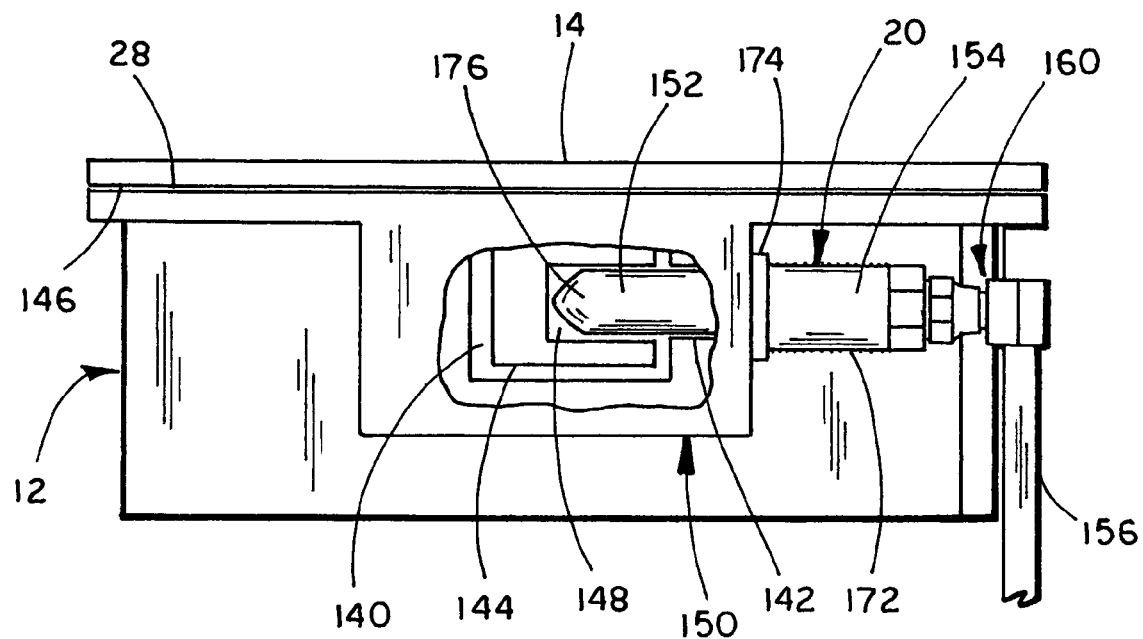
FIG. 3 is a front view of a hopper with a cut-out of a substantially rectangular housing showing a latch assembly of the present invention.
Figure 4:
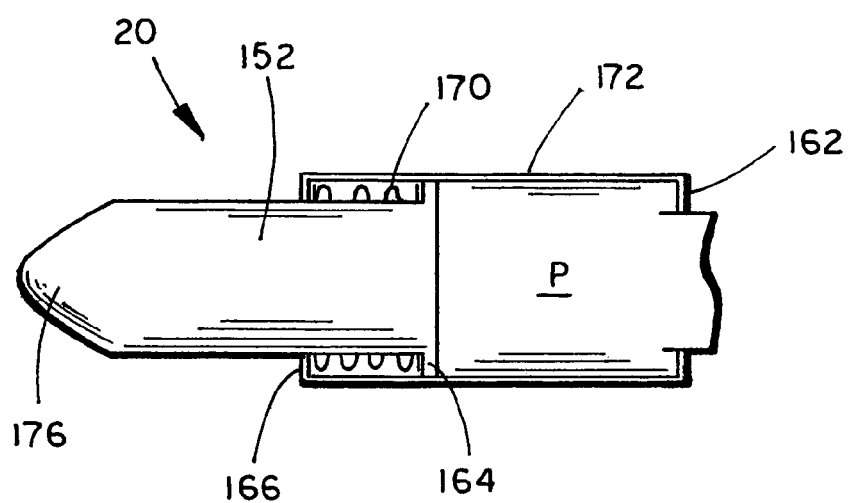
FIG. 4 is a cross-sectional view of the latch assembly of the present invention.
Figure 5:
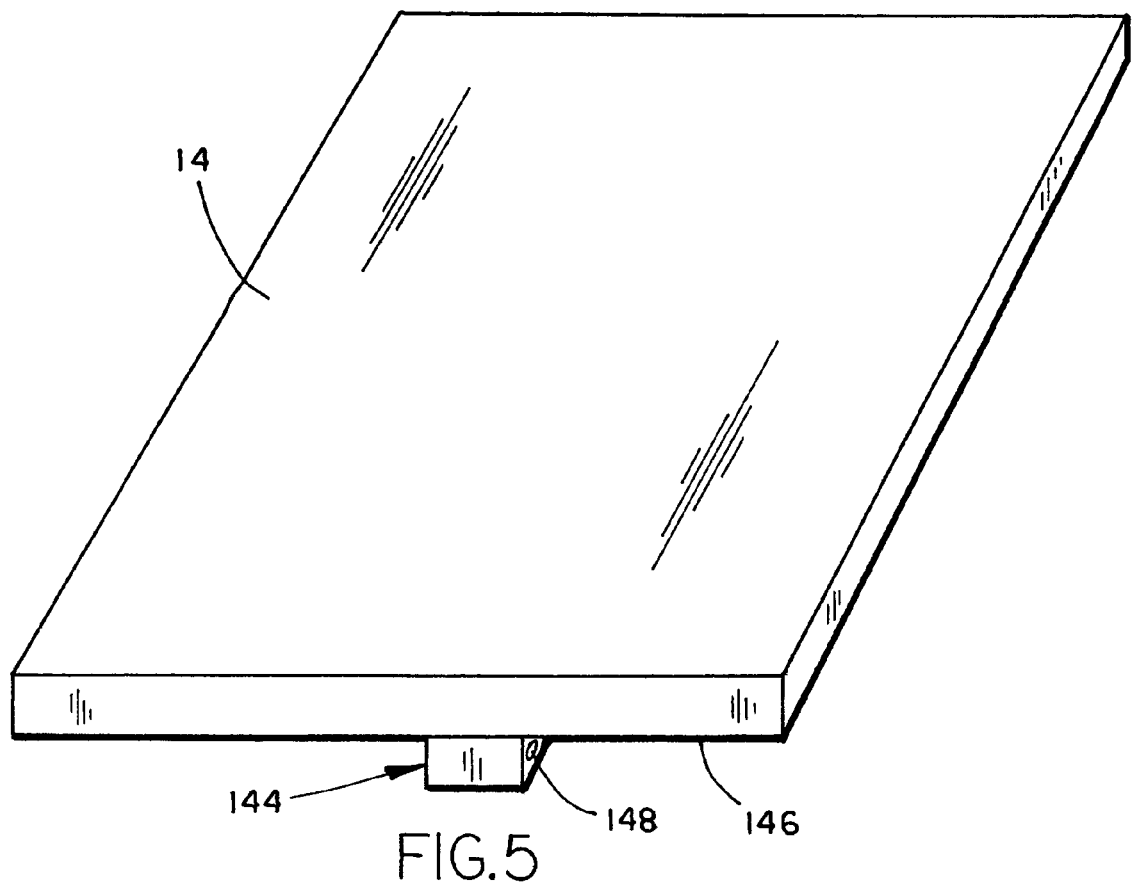
FIG. 5 is a perspective view of a lid for the dough divider of the present invention.

The illustrated latch assembly 20 (FIGS. 3 and 4) automatically activates to maintain the lid 14 in the closed position when the press plate 16 is moved towards the lid 14. The latch assembly 20 also automatically deactivates to discontinue maintaining the lid 14 in the closed position after the dough has been compressed and divided within the hopper 12. As seen in FIGS. 1 and 3, a substantially rectangular housing 150 is attached to the front of the hopper 12 and the bottom of the rectangular flange 28 of the hopper 12. The rectangular housing 150 includes a first upwardly facing aperture 140 and a second laterally facing aperture 142 that intersect at a right angle within the rectangular housing 150. As seen in FIG. 5, the lid 14 includes a pin sleeve 144 having a rectangular configuration and extending from a bottom face 146 of the lid 14. The pin sleeve 144 extends into the first upwardly facing aperture 140 when the lid 14 is in the closed position. The latch assembly 20 (FIG. 3) includes a pin 152 that extends into the second laterally facing aperture 142 and into an opening 148 in the side of the pin sleeve 144 when the lid 14 is in the closed position and when the latch assembly 20 is activated in order to maintain the lid 14 in the closed position. A pin housing 154, which is co-axially aligned with the second laterally facing aperture 142, houses the pin 152. The pin 152 and the pin housing 154 are substantially cylindrical, with the pin 152 being closely received within the pin housing 154. A pressurized fluid P traveling through a hose 156 enters through a right angle connection 160 and into the pin housing 154 to activate the latch assembly 20. As seen in FIG. 4, the pressurized fluid P enters the pin housing 154 at a first end 162 opposite the second laterally facing aperture 142. When the pressurized fluid P enters the pin housing 154, the pressurized fluid P exerts pressure against an enlarged end 164 of the pin 152, thereby forcing the pin 152 laterally out a second end 166 of the pin housing 154 and into the second laterally facing aperture 142. The pin 152 then extends into the opening 148 in the pin sleeve 144 when the lid 14 is in the closed position to maintain the lid 14 in the closed position. A coil spring 170 surrounds the pin 152 within the housing 154. The coil spring 170 exerts a lateral force against the enlarged end 164 of the pin 150 and the second end 166 of the pin housing 154. Since the second end 166 of the pin housing 154 is fixed in position, the pin 152 will be forced by the spring 170 out of the opening 148 in the side of the pin sleeve 144, out of the second laterally facing aperture 142 and into the pin housing 154 when the pressurized fluid P does not exert pressure against the enlarged end 164 of the pin 152, thereby deactivating the latch assembly 20. Preferably, the pin housing 154 includes an outside thread 172 for connection to the substantially rectangular housing 150. Furthermore, a nut 174 is preferably located around the outside thread 172 and adjacent the substantially rectangular housing 150 to provide a better connection between the pin housing 154 and the substantially rectangular housing 150. Moreover, the pin 152 preferably has a conical nose 176 to help the pin 152 enter the opening 148 in the side of the pin sleeve 144 if the opening 148 is not exactly aligned with the pin 152 by forcing the opening 148 in the side of the pin sleeve 144 upward or downward in order to align the opening 148 with the pin 152.

As shown in FIG. 1, the dough divider 10 has a bottom rectangular base plate 44 supported on the casters 32. A motor and pump assembly 46 is mounted or integrally formed on one side of the base plate 44 and a hydraulic oil tank assembly 48 is mounted on another side of the base plate 44. The motor and pump assembly 46 is connected to the hydraulic oil tank assembly 48 by a suction line 45 in order to help pump oil from the hydraulic oil tank assembly 48, thereby operating the reversible divider cylinder 18 (FIG. 8). Two front hexagonal lower supports 50 and two back hexagonal lower supports 51 are also connected to the base plate 44, and a cylinder housing 52 is connected to the top of the four lower supports 50 and 51. A middle rectangular plate 54 is attached to the top of the cylinder housing 52. The reversible cylinder assembly 18 is located within the cylinder housing 52 and protrudes through the middle rectangular plate 54. A four-way valve 110 below the cylinder housing 52 is connected to the hydraulic oil tank assembly 48 by a first tube 49 in order to connect the hydraulic oil tank assembly 48 to the reversible cylinder assembly 18. The four-way valve 110 as described in this application is commercially available from Husco International located in Waukesha, Wis., under the parts Inlet Section 5001-A59, Spool Section 5002-A10, Outlet Section 5003-A3, Pilot Oper. Relief 5060-B, Tank Port O-Ring Plug R-771-10, Bolt Kit 6131-1 and Link 52257. Those skilled in the art will appreciate that other similarly functioning valves may be used. The four-way valve 110 is also connected to the motor and pump assembly 46 by a second tube 53 in order to complete a fluid path between the four-way valve 110, the motor and pump assembly 46 and the hydraulic oil tank assembly 48. When the motor and pump assembly 46 is turned on, oil is pumped from the motor and pump assembly 46 through second tube 53 to the four-way valve 110, through the four-way valve 110, to the hydraulic oil tank assembly 48 from the four-way valve 110 through the first tube 49, and from the hydraulic oil tank assembly 48 to the motor and pump assembly 46. As described in more detail below, the oil is diverted through the four-way valve 110 to the reversible cylinder assembly 18 in order to divide the dough into equal portions.

The illustrated dough divider 10 also includes the hopper 12 at a top end which is connected to the middle rectangular plate 54 by several upper supports 56. The hopper 12 includes an annular wall 57 with the rectangular flange 28 integral with the top of the annular wall 57. In the illustrated example, seven upper supports 56 with a hexagonal cross-section, three in the front of the main housing body 26 and four in the back of the main housing body 26, are located between the middle rectangular plate 54 and the rectangular flange 28 of the hopper 12. The switch housing 36 is attached to a front right upper support 56a and the control valve handle 38 is attached to a front left upper support 56b and the front right upper support 56a. A front central support 56c is located between the front left upper support 56b and the front right upper support 56a. A dough dividing assembly 58 is located between the middle rectangular plate 54 and the hopper 12. As explained in more detail below, the dough dividing assembly 58 compresses the dough and divides the dough into equal portions.

Figure 6:
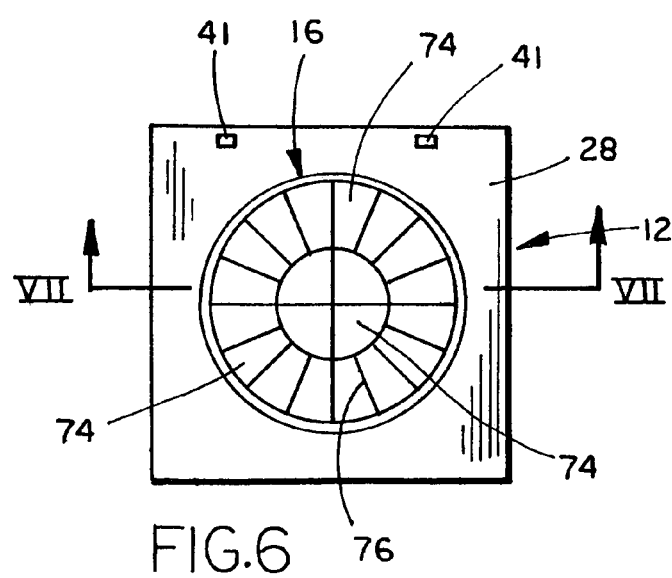
FIG. 6 is a top view of the hopper of the present invention.

As shown in FIG. 8, the dough dividing assembly 58 includes the press plate 16, stanchions 60, a stanchion support plate 62, a knife assembly 64, knife assembly supports 66 and a knife assembly support plate 68. The press plate 16 has a planar top surface 70, a planar bottom surface 72 and a configuration analogous to the annular wall 57 of the hopper, whereby the press plate 16 can slide vertically within the annular wall 57. In the illustrated example, the press plate 16 includes several individual press sections 74 (FIG. 6). The press plate 16 preferably has 16, 20 or 24 individual press sections 74, although any number of individual press sections 74 could be used depending on the desired number of equal weight pieces of dough. In the illustrated example, the press plate 16 is divided into 20 individual press sections 74 defined by a sixteen sided polygon within a circle, perpendicular cross lines that pass through the center of the circle and partial radial lines extending from each meeting point of the straight lines of the polygon to the outside of the circle. As to be described in more detail below, the knife assembly 64 protrudes through vertical openings 76 between the individual press sections 74 defined by the sixteen sided polygon, the perpendicular cross lines and the partial radial lines. The knife assembly 64 divides the dough into equal weight, ready to use pieces.

In the illustrated example, the stanchion support plate 62 is rectangular and connected to each of the individual press sections 74 by the stanchions 60, with one stanchion 60 per individual press section 74. Therefore, the stanchion support plate 62 can move each of the individual press sections 74 of the press plate 16 on a substantially horizontal plate within the annular wall 57 of the hopper 12. As to be described in more detail below, the reversible cylinder assembly 18 is connected to the bottom of the stanchion support plate 62 in order to force the stanchion support plate 62, the stanchions 60 and the individual press sections 74 of the press plate 16 upwards or downwards within the annular wall 57 of the hopper 12.

In the illustrated example, the knife assembly support plate 68 is rectangular and located between the middle plate 54 and the stanchion support plate 62. Four knife assembly supports 66 are attached to the top surface of the knife assembly support plate 68 and protrude through openings 78 adjacent the corners of the stanchion support plate 62. The knife assembly 64 is attached to the top of the knife assembly supports 66 and located between the press plate 16 and the stanchion support plate 62. The reversible cylinder assembly 18 is connected to the bottom of the knife assembly support plate 68 in order to force the knife assembly support plate 68 and the knife assembly supports 66 upward, thereby forcing the knife assembly 64 through the vertical openings 76 in the press plate 16.

The illustrated reversible cylinder 18 includes a housing tube 80 slidably supporting an inner telescoping rod 82 and an outer telescoping rod 86. The inner telescoping rod 82 has a first piston 84 at a bottom end of the inner telescoping rod 82 adjacent a bottom 92 of the housing tube 80. The outer telescoping rod 86 has a second piston 88 at a bottom end of the outer telescoping rod 86 adjacent a top 93 of the housing tube 80. The first piston 84 and the second piston 88 therefore separate the housing tube 80 into a first oil area 94 between the bottom 92 of the housing tube 80 and the first piston 84, a second oil area 96 between the first piston 84 and the second piston 88 and a third oil area 98 between the second piston 88 and the top 93 of the housing tube 80. The first oil area 94 is fluidly connected to the second oil area 96 through a first valve 100 in the first piston 84 and the second oil area 96 is fluidly connected to the third oil area 98 through a second valve 102 in the second piston 88. As described in more detail below, the first oil area 94, the second oil area 96, the third oil area 98, the first valve 100 and the second valve 102 help to operate the knife assembly 64 and the press plate 16. As shown in FIG. 8, the inner rod 82 telescopes through the outer rod 86 and protrudes through the top of the housing tube 80 to connect to the stanchion support plate 62. Likewise, the outer rod 86 protrudes through the top of the housing tube 80 and connects to the knife assembly support plate 68. Therefore, the outer rod 86 can telescopingly slide around the inner rod 82 to move the knife assembly 64 relative to the press plate 16.

Operation

To divide dough using the dough divider 10, an operator first presses the power-on button 34 of the switch housing 36. Motor and pump assembly 46 responds by pumping oil through the second tube 53, into the four-way valve 110 and out of the four-way valve 110 though the first tube 49. The operator then places dough into a chamber 90 of the hopper 12 defined by the annular wall 57 of the hopper 12. At the starting point, the top of blade assembly 64 is located on an even horizontal plane with the press plate 16, thereby making an even floor for the hopper 12. After placing the dough in the hopper 12, the operator shuts lid 14 and holds the lid 14 in the closed position.

The operator then lifts control valve handle 38, which is connected to the four-way valve 110 via linkage 104. When the power-on button 34 is pressed, oil is pumped through the second tube 53 into the four-way valve 110 and out the four-way valve 110 into the first tube 49, which is coupled to the hydraulic oil tank 48. When the control valve handle 38 is lifted, the oil passes from the motor and pump assembly 46 into the second tube 53, through the four-way valve and into a third tube 114 connected to the hose 156 and to the first oil area 94. Furthermore, oil from the third oil area 98 will be forced through a port 108 into a fourth tube 116 connected to the four-way valve 110. The oil passing though the fourth tube 116 from the third oil area 98 further passes through the four-way valve 110 and into the hydraulic oil tank 48 through the first tube 49.

Figure 7:
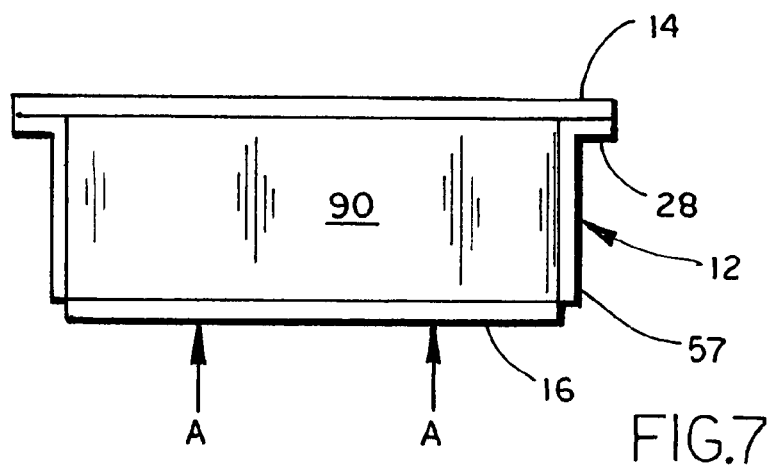
FIG. 7 is a cross-sectional view of the hopper, lid and press plate of the present invention.

The oil that the four-way valve 110 diverts through the third tube 114 into the hose 156 will apply pressure to the enlarged end 164 of the pin 152 as described above to automatically activate the latch assembly 20 to maintain the lid 14 in the closed position. The oil that the four-way valve 110 also diverts through the third tube 114 into the first oil area 94 applies pressure to the bottom of the first piston 84. At this point, the first valve 100 in the first piston 84 and the second valve 102 in the second piston 88 are not open. Therefore, oil in the second oil area 96 cannot escape, and the first piston 84 and the second piston 88 will raise together. The first piston 84 is connected to the inner telescoping rod 82, the stanchion support plate 62, the stanchions 60 and the press plate 16. The reversible cylinder 18 therefore places pressure on the press plate 16 at A (FIG. 7), thereby pushing the dough upward within the chamber 90 towards the lid 14. Accordingly, the press plate 16 will thereby squeeze the dough and remove all air in the chamber 90 as the first piston 84 and the second piston 88 rise: The dough will therefore spread out and completely and uniformly fill the remaining area within the chamber 90 of the hopper 12. At this point, the pressure in chamber 90 and the first oil area 94 begins to rise until it reaches a predetermined pressure at which point the first valve 100 in the first piston 84 begins to open and continues to open until the pressure rises to a predetermined level. At the predetermined level, the first valve 100 opens, thereby allowing oil to flow from the first oil area 94 to the second oil area 96. Furthermore, the first piston 84 and the associated press plate 16 will stop rising. Preferably, the third tube 114 includes a delay device 250 that slows the flow of oil from the four-way valve 110 to the first oil area 94, such that the oil flowing through the hose 156 activates the latch assembly 20 before a sufficient amount of oil flows into the first oil area 94 such that the press plate 16 moves upward. Therefore, the driving of the press plate 16 towards the lid 14 is delayed such that the latch assembly 20 is activated a predetermined amount of time before the press plate 16 is driven towards the lid 14. Preferably, the delay device 250 includes a flow restrictor in the third tube 114 between the area where the third tube 114 is connected to the hose 156 and the first oil area 94.

Once the first valve 100 in the first piston 84 is opened, the oil will flow into the second oil area 96 and exert pressure on the second piston 88, thereby moving the outer telescoping rod 86 and the second piston 88. The outer telescoping rod 86 is connected to the knife assembly support plate 68, the knife assembly supports 66 and the knife assembly 64, and the knife assembly 64 rises with the second piston 88. The outer telescoping rod 86 therefore raises the knife assembly 64, causing the knife assembly 64 to sever the dough into the desired number of pieces. The knife assembly 64 continues to rise until it reaches the lid 14. At this point, the pressure between the first piston 84 and the second piston 88 rises until either an external relief pressure is achieved or a cracking pressure of the second valve 102 is reached. The external relief pressure is a predetermined pressure which can be set by a user of the dough divider 10 whereby the four-way valve 110 will stop the flow of oil to the reversible cylinder 18 and allow the oil to return to the hydraulic oil tank 48. If the second valve 102 is cracked, the oil will flow freely through the reversible cylinder 18, thereby stopping the rise of the first piston 84 and the second piston 88. Although the oil is flowing freely through the reversible cylinder 18, the press plate 16 is still being forced against the bottom of the first piston 84 and the second piston 88. Therefore, the first piston 84 and the second piston 88 will still be pushed upward. Consequently, the press plate 16 will continue to be driven towards the lid 14, although the press plate 16 does not move upward. Accordingly, the latch assembly 20 will continue to be activated. Moreover, the second piston 88 should not be dead headed at this point, so that the knife assembly 64 can extend $1/32$ to $1/16$ inches past the top of the rectangular flange 28 of the hopper 12. This knife assembly 64 is set this way to insure a complete cut of the dough. Since the oil that the four-way valve 110 diverts through the third tube 114 into the hose 156 will automatically activate the latch assembly 20 to maintain the lid 14 in the closed position as described above, the latch assembly is automatically activated to maintain the lid in the closed position when the press plate or the knife assembly is moved towards the lid.

After the knife assembly 64 cuts the dough, the operator releases the control valve handle 38. At this point, the four-way valve 110 no longer diverts oil through the third tube 114 and into the hose 156. Therefore, the oil no longer exerts pressure against the enlarged end 164 of the pin 152, the lower piston 84 or the press plate 16. Consequently, the pin 152 is retracted out of the pin sleeve 144 and into the pin housing 154. Accordingly, the latch assembly 20 is automatically deactivated after the dough has been compressed and divided within the hopper 12 and when the control valve handle 38 is released. Thus, the latch assembly 20 is deactivated and the lid 14 is no longer held in the closed position. Furthermore, once the handle 38 is released, the pressure in the reversible cylinder 18 falls and the first valve 100 in the first piston 84 closes. The control valve handle 38 is once again lifted, applying oil to the bottom of the first piston 84 and forcing the first piston 84 to rise. Since the second piston 88 is at the top of the housing tube 80 when the knife assembly 64 is at the top of the hopper, the second piston 88 will not be able to rise. Therefore, the first piston 84 will move towards the second piston 88. The oil trapped between the first piston 84 and the second piston 88 is then discharged through the second valve 102 in the second piston 88, thereby returning the oil through the four-way valve 110 to the hydraulic oil tank assembly 48. The first piston 84 and the inner telescoping rod 82 will then rise, moving the individual press sections 74 of the press plate 16 between the knife assembly 64 and ejecting the cut pieces of dough.

Once the operator has removed the dough, the operator lowers the control valve handle 38, thereby forcing the oil from the motor and pump assembly 46 into the fourth tube 116 connected to the third oil area 98 of the housing tube 80 through the port 108. Furthermore, oil from the first oil area 94 is forced through the port 106 into the third tube 114 connected to the four-way valve 110 and into the hydraulic oil tank 48. Therefore, pressure is applied to the top of the second piston 88 to retract the knife assembly 64 and the press plate 16, and the dough divider is ready to be used again. The control valve handle 38 can also be lowered before the lid 14 is opened and after the dough has been cut in order to retract the dough divider assembly 58, thereby reducing the pressure on the lid 14 of the dough divider 10 so that the lid 14 can be opened more easily.

If the dough is left in the chamber 90 after the first piston 84 and the second piston 88 have been fully raised in the housing tube 80, yeast in the dough will cause the dough to rise. The rising dough exerts pressure against the lid 14. To counter act the pressure from the rising dough, the dough divider 10 is provided with the pressure relief system. The pressure relief system includes the reversible cylinder assembly 18 and automatic latch assembly 20. As the pressure rises in the chamber 90 from the rising dough, pressure is exerted against the lid 14 and the press plate 16. Although the four-way valve 110 does not pump oil through the third tube 114 to the first oil area 94 or through the fourth tube 116 to the third oil area 98 when the valve control handle 38 is released, oil from the first oil area 94 is allowed to return to four-way valve 110 through the tube 114 and return to tank 48. Therefore, the pressure in the first oil area 94 can decrease and allow the first piston 84 and the associated press plate 16 to lower. The press plate 16, however, is held in a horizontal location within the hopper 12 because of the friction between the sides of the press plate 16 and the inside circumference of the annular wall 57 of the hopper 12. However, once the yeast in the dough causes the dough to rise and exert pressure against the press plate 16, the press plate 16 can lower when the pressure exerted against the top of the press plate reaches a level high enough to overcome the friction holding the press plate 16 on the horizontal level. The press plate 16 therefore is allowed to lower and relieve the pressure within the chamber 90. Furthermore, as described above, the latch assembly 20 is deactivated once the control valve handle 38 is released, thereby opening the lid 14 and relieving the pressure in the hopper 12. Accordingly, the reversible cylinder assembly 18 and the automatic latch assembly 20 work in combination to relieve the pressure within the hopper 12.

By providing a pressure relief mechanism such as that described above, pressure is not allowed to reach high enough levels in the hopper to cause the lid to rapidly open upon release of the latch assembly. The inventive pressure relief mechanism thereby makes the dough divider safer to operate.

The above description is considered that of the preferred embodiment only. Modification of the invention will occur to those skilled in the art and to those who make or use the invention. For example, it is contemplated that the bottom rectangular plate, the middle rectangular plate, the rectangular flange and the lid could have any geometric configuration. Additionally, chamber 90 may be rectangular or any other shape. Moreover, it is understood that the terms "hose" and "tube" both refer to flexible and still mechanical lines. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A food press comprising:
a hopper with a lid, the lid having an open position and a closed position;
a latch assembly adapted to maintain the lid in the closed position when activated and to discontinue maintaining the lid in the closed position when deactivated;
a press plate vertically slidable within the hopper;
the hopper being adapted to accept food between the lid and the press plate;
the press plate adapted to be driven towards the lid in order to compress the food between the press plate and the lid within the hopper;
wherein when a drive for the press plate is actuated, the latch assembly automatically activates to maintain the lid in the closed position while the press plate is being driven towards the lid.

2. The food press of claim 1, further including:
a delay device configured to delay the driving of the press plate towards the lid such that the latch assembly is activated a predetermined amount of time before the press plate is driven towards the lid.

3. The food press of claim 1, wherein:
the press plate has a vertical stroke between a top of the hopper and a bottom of the hopper; and
the press plate is configured to move towards the bottom of the hopper when pressure applied to a top of the press plate from the food within the hopper reaches a predetermined level.

4. The food press of claim 3, wherein:
the predetermined level is an amount of force greater than an amount of friction between the hopper and the press plate.

5. The food press of claim 3, further including:
a reversible cylinder assembly configured to move the press plate between the top of the hopper and the bottom of the hopper.

6. The food press of claim 5, wherein:
the reversible cylinder assembly is adapted to move downward in order to allow the press plate to move towards the bottom of the hopper when the pressure applied to the top of the press plate from the food when the hopper reaches the predetermined level.

7. The food press of claim 6, further comprising:
a knife assembly adapted to protrude through the press plate and divide the food into an equal number of pieces.

8. The food press of claim 7, wherein:
the cylinder assembly includes a first rod telescoping with a second rod;
the first rod being connected to the press plate and the second rod being connected to the knife assembly.

9. The food press of claim 3, further including:
a delay device configured to delay the driving of the press plate towards the lid such that the latch assembly is activated a predetermined amount of time before the press plate is driven towards the lid.

10. The food press of claim 3, wherein:
the lid is rotatably connected to the hopper and adapted to compress the food within the hopper.

11. The food press of claim 1, wherein:
the lid is rotatably connected to the hopper and adapted to compress the food within the hopper.

12. The food press of claim 11, further comprising:
a knife assembly adapted to protrude through the press plate and divide the food into an equal number of pieces.

13. The food press of claim 1, further comprising:
a knife assembly adapted to protrude through the press plate and divide the food into an equal number of pieces.

14. The food press of claim 13, wherein:
the knife assembly is configured to divide the food into 16 pieces.

15. The food press of claim 13, wherein:
the knife assembly is configured to divide the food into 20 pieces.

16. The food press of claim 13, wherein:
the knife assembly is configured to divide the food into 24 pieces.

17. The food press of claim 1, further comprising:
a hydraulic assembly adapted to drive the press plate towards the lid.

18. The food press of claim 17, wherein:
the hydraulic assembly is further adapted to activate the latch assembly.

19. The food press of claim 18, wherein:
the latch assembly automatically deactivates when the latch assembly is not activated by the hydraulic assembly.

20. The food press of claim 1, further comprising:
a reversible cylinder assembly being connected to the press plate and adapted to move downward in order to allow the press plate to move towards a bottom of the hopper when pressure applied to a top of the press plate from rising food when the hopper reaches a predetermined level.

21. A food press comprising:
a hopper with a lid, the lid having an open position and a closed position;
a latch assembly adapted to maintain the lid in the closed position when activated and to discontinue maintaining the lid in the closed position when deactivated;
a press plate vertically slidable within the hopper;
the hopper being adapted to accept food between the lid and the press plate;
the press plate adapted to be driven towards the lid in order to compress the food between the press plate and the lid within the hopper;
wherein when a drive for the press plate is deactuated, the latch assembly automatically deactivates to discontinue maintaining the lid in the closed position after the food has been compressed within the hopper.

22. The food press of claim 21, wherein:
the press plate has a vertical stroke between a top of the hopper and a bottom of the hopper; and
the press plate is configured to move towards the bottom of the hopper when pressure applied to a top of the press plate from the food when the hopper reaches a predetermined level.

23. The food press of claim 22, wherein:
the predetermined level is an amount of force greater than an amount of friction between the hopper and the press plate.

24. The food press of claim 22, further including:
a reversible cylinder assembly configured to move the press plate between the top of the hopper and the bottom of the hopper.

25. The food press of claim 24, wherein:
the cylinder assembly is adapted to move downward in order to allow the press plate to move towards the bottom of the hopper when the pressure applied to the top of the press plate from the food within the hopper reaches the predetermined level.

26. The food press of claim 25, further comprising:
a knife assembly adapted to protrude through the press plate and divide the food into an equal number of pieces.

27. The food press of claim 26, wherein:
the cylinder assembly includes a first rod telescoping with a second rod; the first rod being connected to the press plate and the second rod being connected to the knife assembly.

28. The food press of claim 22, wherein:
the lid is rotatably connected to the hopper and adapted to compress the food within the hopper in the closed position.

29. The food press of claim 28, wherein:
a coil spring connected to the lid automatically rotates the lid to the open position when the latch assembly is deactivated.

30. The food press of claim 21, wherein:
the lid is rotatably connected to the hopper and adapted to compress the food within the hopper in the closed position.

31. The food press of claim 30, wherein:
a coil spring connected to the lid automatically rotates the lid to the open position when the latch assembly is deactivated.

32. The food press of claim 30, further comprising:
a knife assembly adapted to protrude through the press plate and divide the food into an equal number of pieces.

33. The food press of claim 21, further comprising:
a knife assembly adapted to protrude through the press plate and divide the food into an equal number of pieces.

34. The food press of claim 33, wherein:
the knife assembly is configured to divide the food into 16 pieces.

35. The food press of claim 33, wherein:
the knife assembly is configured to divide the food into 20 pieces.

36. The food press of claim 33, wherein:
the knife assembly is configured to divide the food into 24 pieces.

37. The food press of claim 21, further comprising:
a hydraulic assembly adapted to drive the press plate towards the lid.

38. The food press of claim 37, wherein:
the hydraulic assembly is further adapted to activate the latch assembly.

39. The food press of claim 21, further comprising:
a reversible cylinder assembly being connected to the press plate and adapted to move downward in order to allow the press plate to move towards a bottom of the hopper when pressure applied to a top of the press plate from rising food within the hopper reaches a predetermined level.

40. The food press of claim 21, further comprising:
an actuating mechanism for driving the press plate towards the lid when activated;
wherein the latch assembly is automatically deactivated to discontinue maintaining the lid in the closed position when the actuating mechanism is not activated.

41. A food press comprising:
a hopper with a lid, the lid having an open position and a closed position;
a closure mechanism comprising a first member on the lid and a second member on the hopper configured to interact to maintain the lid in the closed position when the closure mechanism is activated and to discontinue maintaining the lid in the closed position when the closure mechanism is deactivated;

a press plate vertically slidable within the hopper;
the hopper being adapted to accept food between the lid and the press plate;
the press plate adapted to be driven towards the lid in order to compress the food between the press plate and the lid within the hopper;
wherein when a drive for the press plate is actuated, the closure mechanism automatically activates to maintain the lid in the closed position while the press plate is being driven towards the lid.

42. The food press of claim 41, further including:
a delay device configured to delay the driving of the press plate towards the lid such that the closure mechanism is activated a predetermined amount of time before the press plate is driven towards the lid.

43. The food press of claim 41, wherein:
the press plate has a vertical stroke between a top of the hopper and a bottom of the hopper; and
the press plate is configured to move towards the bottom of the hopper when pressure applied to a top of the press plate from the food within the hopper reaches a predetermined level.

44. The food press of claim 43, wherein:
the predetermined level is an amount of force greater than an amount of friction between the hopper and the press plate.

45. The food press of claim 43, further including:
a reversible cylinder assembly configured to move the press plate between the top of the hopper and the bottom of the hopper.

46. The food press of claim 45, wherein:
the reversible cylinder assembly is adapted to move downward in order to allow the press plate to move towards the bottom of the hopper when the pressure applied to the top of the press plate from the food when the hopper reaches the predetermined level.

47. The food press of claim 41, wherein:
the lid is rotatably connected to the hopper and adapted to compress the food within the hopper.

48. The food press of claim 47, further comprising:
a knife assembly adapted to protrude through the press plate and divide the food into an equal number of pieces.

49. The food press of claim 41, further comprising:
a hydraulic assembly adapted to drive the press plate towards the lid.

50. The food press of claim 49, wherein:
the hydraulic assembly is further adapted to activate the closure mechanism.

51. The food press of claim 50, wherein:
the closure mechanism automatically deactivates when the closure mechanism is not activated by the hydraulic assembly.

52. The food press of claim 41, further comprising:
a reversible cylinder assembly being connected to the press plate and adapted to move downward in order to allow the press plate to move towards a bottom of the hopper when pressure applied to a top of the press plate from rising food when the hopper reaches a predetermined level.

53. A food press comprising:
a hopper with a lid, the lid having an open position and a closed position;
a closure mechanism comprising a first member on the lid and a second member on the hopper configured to interact to maintain the lid in the closed position when the closure mechanism is activated and to discontinue maintaining the lid in the closed position when the closure mechanism is deactivated;
a press plate vertically slidable within the hopper;
the hopper being adapted to accept food between the lid and the press plate;
the press plate adapted to be driven towards the lid in order to compress the food between the press plate and the lid within the hopper;
wherein when a drive for the press plate is deactuated, the closure mechanism automatically deactivates to discontinue maintaining the lid in the closed position after the food has been compressed within the hopper.

54. The food press of claim 53, wherein:
the press plate has a vertical stroke between a top of the hopper and a bottom of the hopper; and
the press plate is configured to move towards the bottom of the hopper when pressure applied to a top of the press plate from the dough when the hopper reaches a predetermined level.

55. The food press of claim 54, wherein:
the predetermined level is an amount of force greater than an amount of friction between the hopper and the press plate.

56. The food press of claim 54, further including:
a reversible cylinder assembly configured to move the press plate between the top of the hopper and the bottom of the hopper.

57. The food press of claim 56, wherein:
the cylinder assembly is adapted to move downward in order to allow the press plate to move towards the bottom of the hopper when the pressure applied to the top of the press plate from the food within the hopper reaches the predetermined level.

58. The food press of claim 53, wherein:
the lid is rotatably connected to the hopper and adapted to compress the food within the hopper in the closed position.

59. The food press of claim 58, wherein:
a coil spring connected to the lid automatically rotates the lid to the open position when the closure mechanism is deactivated.

60. The food press of claim 58, further comprising:
a knife assembly adapted to protrude through the press plate and divide the food into an equal number of pieces.

61. The food press of claim 53, further comprising:
a hydraulic assembly adapted to drive the press plate towards the lid.

62. The food press of claim 61, wherein:
the hydraulic assembly is further adapted to activate the closure mechanism.

63. The food press of claim 53, further comprising:
a reversible cylinder assembly being connected to the press plate and adapted to move downward in order to allow the press plate to move towards a bottom of the hopper when pressure applied to a top of the press plate from rising food within the hopper reaches a predetermined level.

64. The food press of claim 53, further comprising:
an actuating mechanism for driving the press plate towards the lid when activated;
wherein the closure mechanism is automatically deactivated to discontinue maintaining the lid in the closed position when the actuating mechanism is not activated.

65. A food press comprising:

a hopper with a lid, the lid having an open position and a closed position;

means for maintaining the lid in the closed position when the means for maintaining is activated and to discontinue maintaining the lid in the closed position when the means for maintaining is deactivated;

a press plate vertically slidable within the hopper;

the hopper being adapted to accept food between the lid and the press plate;

the press plate adapted to be driven towards the lid in order to compress the food between the press plate and the lid within the hopper;

wherein when a drive for the press plate is actuated, the means for maintaining automatically activates to maintain the lid in the closed position while the press plate is being driven towards the lid.

66. A food press comprising:

a hopper with a lid, the lid having an open position and a closed position;

means for maintaining the lid in the closed position when the means for maintaining is activated and to discontinue maintaining the lid in the closed position when the means for maintaining is deactivated;

a press plate vertically slidable within the hopper;

the hopper being adapted to accept food between the lid and the press plate;

the press plate adapted to be driven towards the lid in order to compress the food between the press plate and the lid within the hopper;

wherein when a drive for the press plate is deactuated, the means for maintaining automatically deactivates to discontinue maintaining the lid in the closed position after the food has been compressed within the hopper.

* * * * *